United States Patent
Parkes

(12) 
(10) Patent No.: US 6,820,572 B1
(45) Date of Patent: Nov. 23, 2004

(54) MOBILE PROSTHETIC APPARATUS FOR DISABLED FOUR-LEGGED ANIMALS

(76) Inventor: Lincoln J. Parkes, 309 S. Morris St., Oxford, MD (US) 21654

(*) Notice: Subject to any disclaimer, the term of this patent is extended or adjusted under 35 U.S.C. 154(b) by 24 days.

(21) Appl. No.: 10/445,636

(22) Filed: May 23, 2003

(51) Int. Cl.$^7$ ............................................. A01K 15/02
(52) U.S. Cl. ...................................... 119/727; 119/728
(58) Field of Search ............................... 119/727, 724, 119/725, 726, 728, 850; 280/290

(56) References Cited

U.S. PATENT DOCUMENTS

| | | | |
|---|---|---|---|
| 2,546,726 A | * | 3/1951 | Creamer ..................... 119/727 |
| 2,976,840 A | * | 3/1961 | Hugus ......................... 119/727 |
| 3,215,117 A | * | 11/1965 | Short .......................... 119/727 |
| 3,406,661 A | | 10/1968 | Parkes |
| 4,185,591 A | | 1/1980 | Patelis |
| 4,375,203 A | | 3/1983 | Parkes |
| 4,428,326 A | | 1/1984 | Dubovick et al. |
| 4,478,213 A | | 10/1984 | Redding |
| 4,528,944 A | | 7/1985 | Reed et al. |
| 4,557,257 A | | 12/1985 | Fernandez et al. |
| 4,572,501 A | | 2/1986 | Durham et al. |
| 4,777,910 A | | 10/1988 | Pecor |
| 4,796,565 A | | 1/1989 | Charbeneau |
| 4,821,676 A | | 4/1989 | Hulterstrum |
| 4,829,937 A | | 5/1989 | Weelink |
| 5,224,444 A | | 7/1993 | Hill et al. |
| 6,199,508 B1 | | 3/2001 | Miale et al. |
| 6,230,662 B1 | | 5/2001 | Miale et al. |
| 6,397,784 B1 | | 6/2002 | Morgan-Albertson et al. |
| 6,640,751 B1 | * | 11/2003 | Cool .......................... 119/727 |
| 6,729,263 B2 | * | 5/2004 | Miale et al. ............... 119/28.5 |

OTHER PUBLICATIONS

Eddie's Wheels Brochure—undated.
Petlife p. 62, Dec. 1998.
Doggon' Wheels Brochure—undated.

* cited by examiner

Primary Examiner—Yvonne R. Abbott

(57) ABSTRACT

A mobile prosthetic apparatus for disabled four-legged animals comprises a cart having a chassis. The chassis includes a front subassembly detachably mounted to a rearward subassembly. A primary wheel is mounted to the frame of the chassis at each side of the rearward end and a set of swively mounted secondary wheels is mounted to the frame at each side of the forward end. A yoke extends across the frame at the forward end and is movable from an active position spanning the side walls of the frame to an inactive position away from one of the side walls to permit entrance and exit of the animal from the cart.

20 Claims, 5 Drawing Sheets

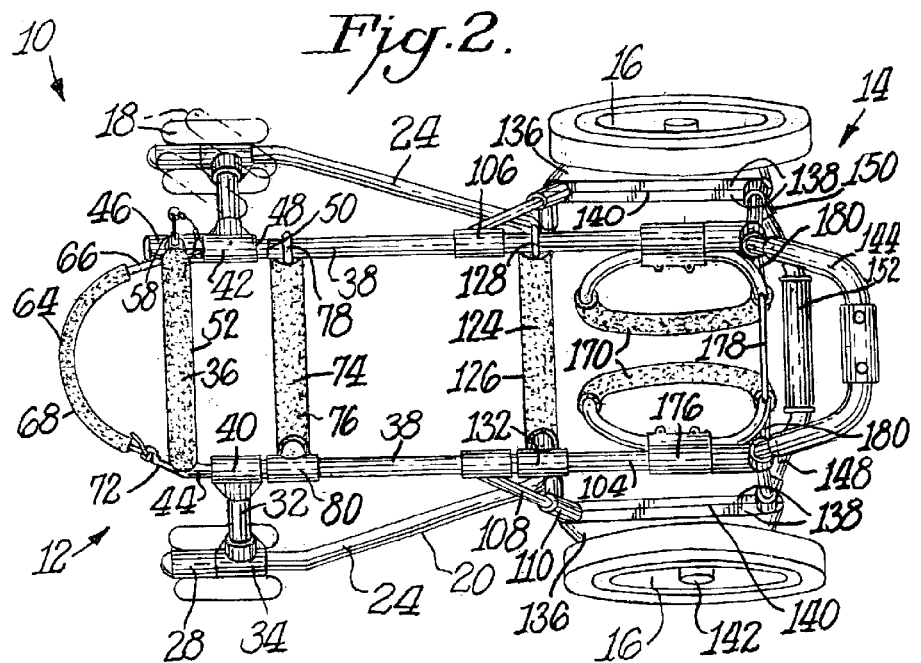

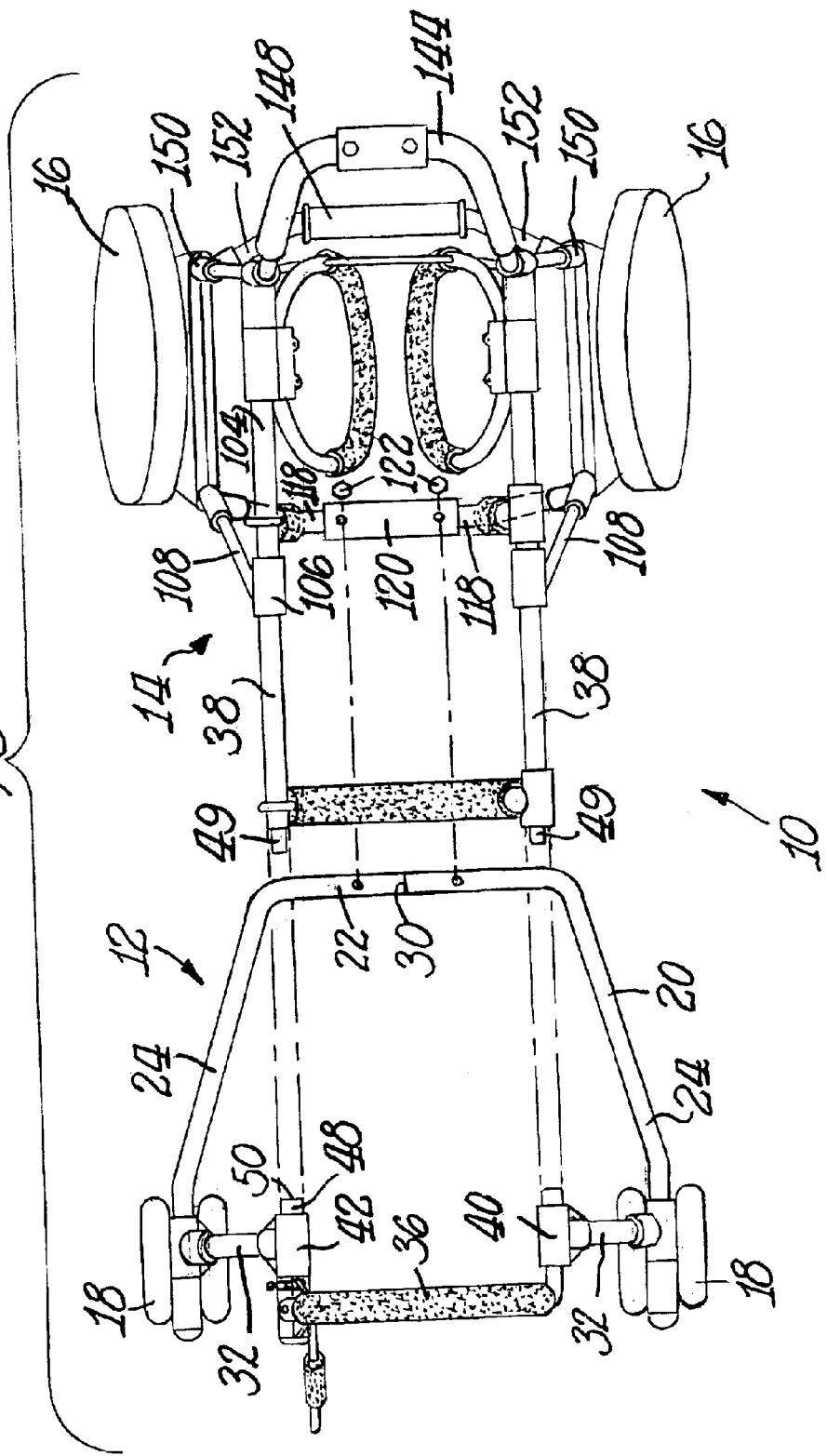

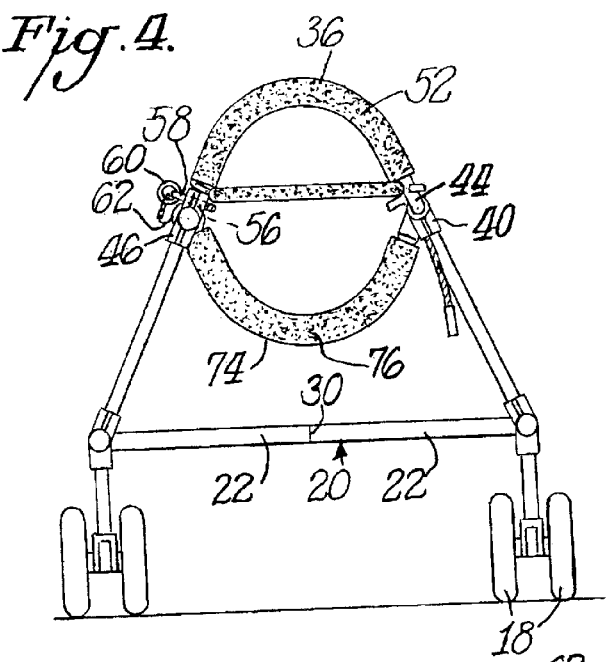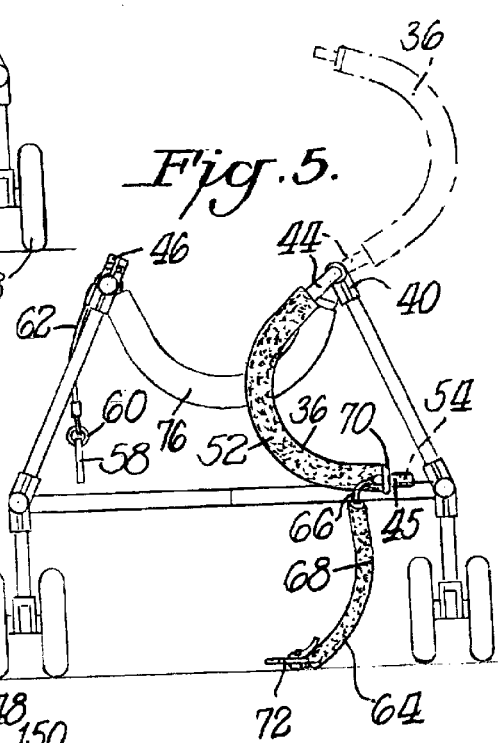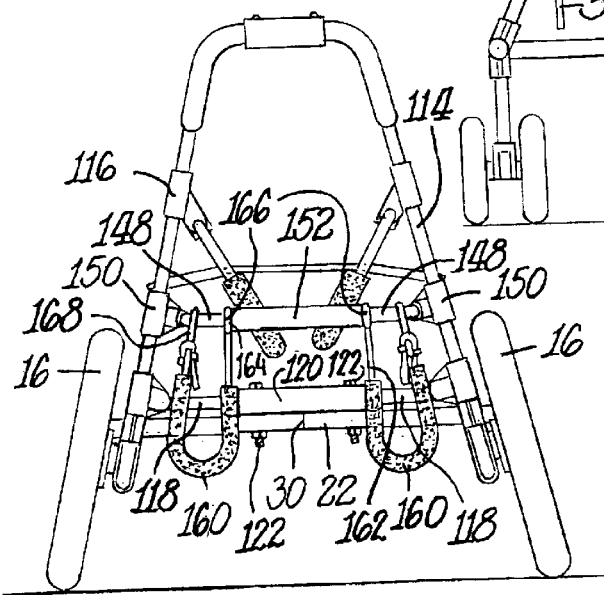

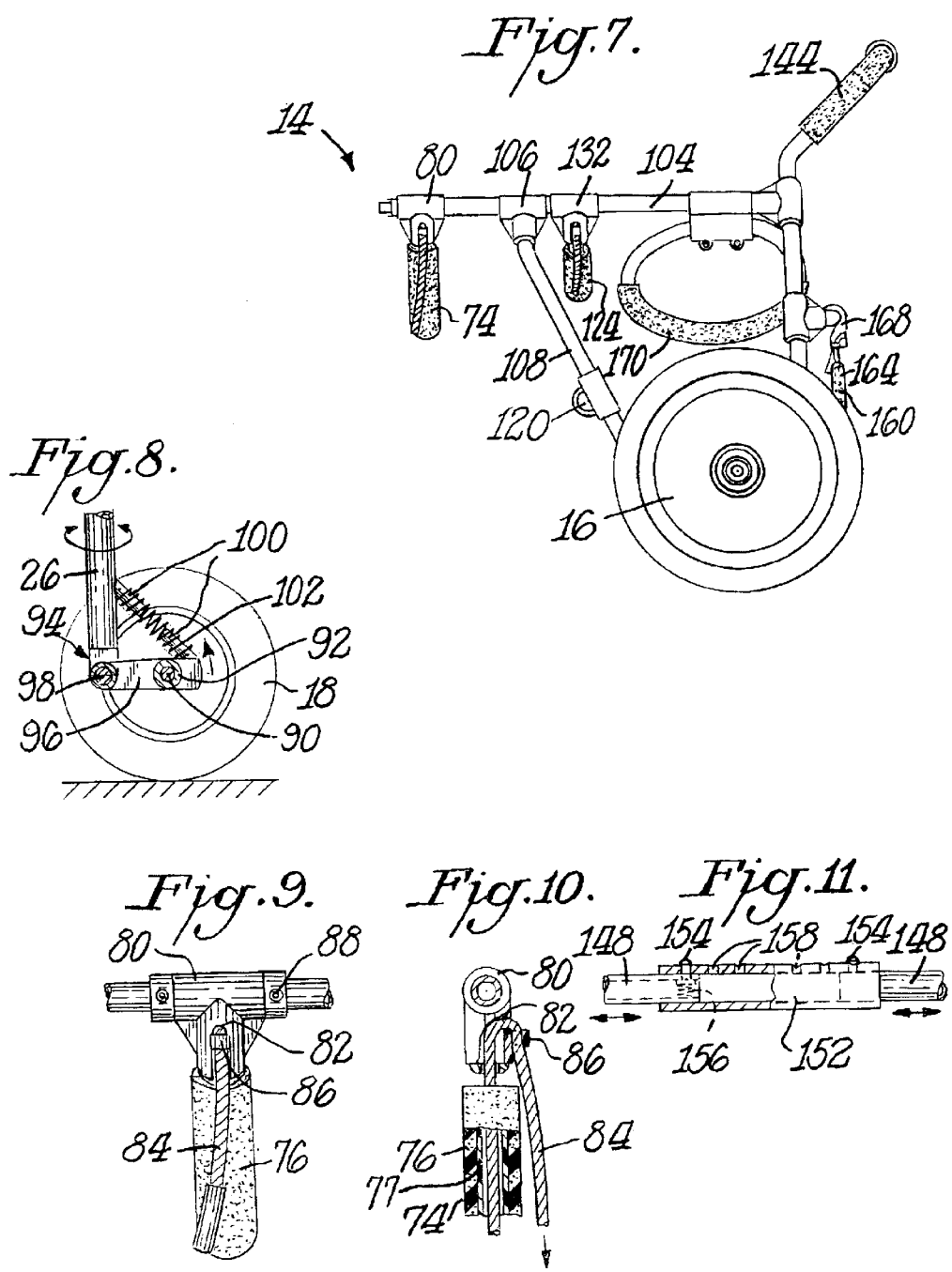

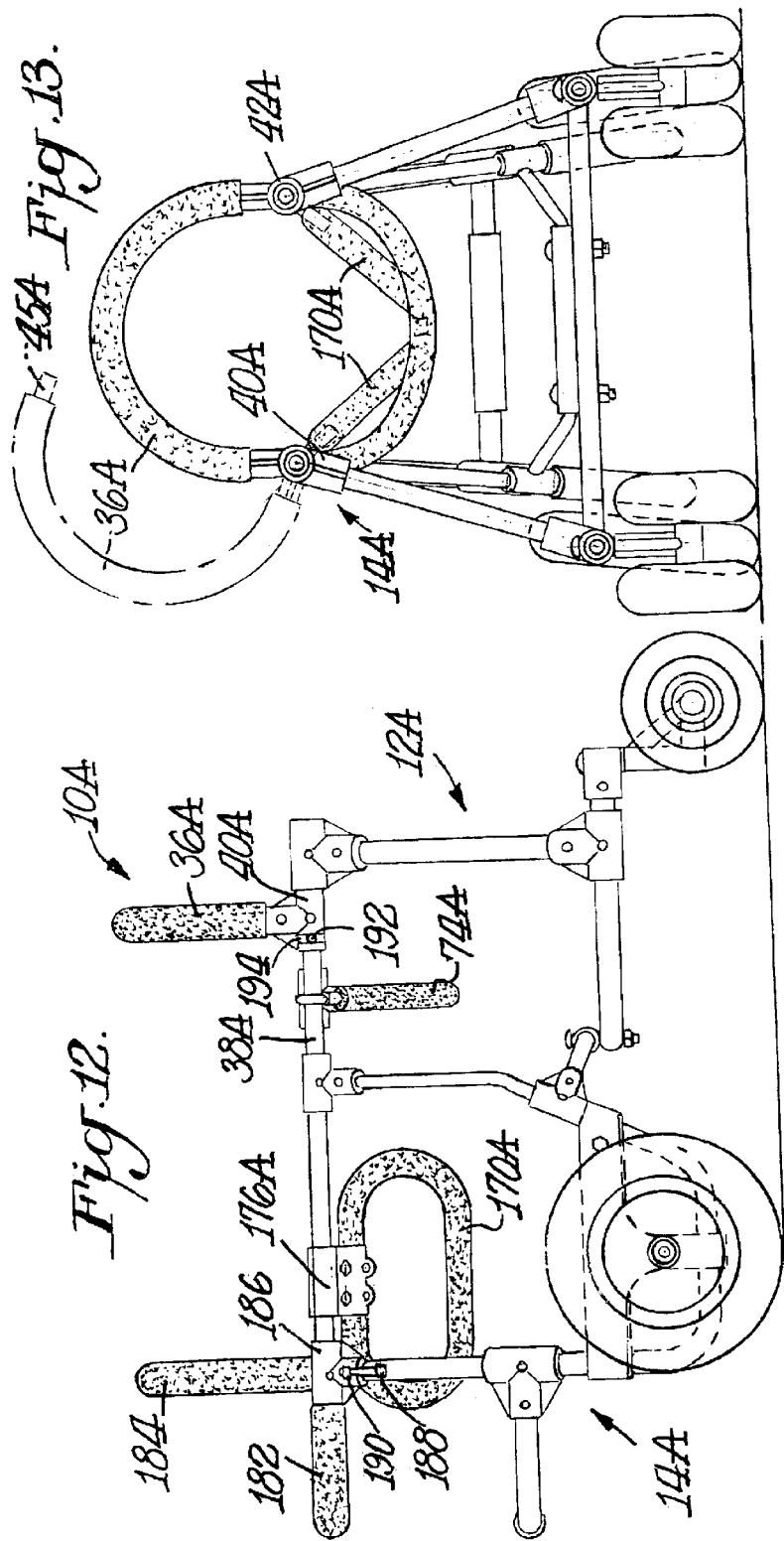

US 6,820,572 B1

MOBILE PROSTHETIC APPARATUS FOR DISABLED FOUR-LEGGED ANIMALS

BACKGROUND OF THE INVENTION

Supportive mobile devices for animals functionally disabled have been known to the art of veterinary medicine for many years. Dogs and other household pets sustain traumatic injury of soft tissue, bone, and/or neural elements resulting in functional disability. Disabling medical conditions include inherited degenerative disorders, disc rupture, and primary diseases of the nervous system. The art has been successful in providing suitable supportive devices allowing animals to enjoy a self-sustained mobile life. Return of mobility to disabled animals reduces the risk of secondary medical problems and improved the mental health of the animal.

Applicant has developed mobile suspensory apparatuses for supporting the rear quarters of disabled animals. For example, U.S. Pat. No. 3,406,661 discloses a cart having a vertical standard extending upward in a loop from an axle having two wheels. A length-adjustable yoke member is attached to the standard at or near the natural height of the animal's hips, and a hip support member comprising two attached horizontal loops made from a single rod, through which the animal's legs are inserted, is attached to the standard slightly above the yoke member.

A similar two-wheeled apparatus having side rods for connection to a harness is disclosed in U.S. Pat. No. 3,215,117 (Short). The Short apparatus supports the animal's rear quarters at its abdomen, and the side rods position the wheels at a predetermined distance from the harness.

Alternate approaches are illustrated in U.S. Pat. No. 3,241,851 (Dingbuam) and U.S. Pat. No. 2,546,726 (Creamer, Jr.). These patents teach apparatus which employ the animal's body itself as a large part of the support structure. Both teach attachment of wheels to injured animals in a manner reminiscent of the attachment of training wheels to a bicycle.

At the other extreme, U.S. Pat. No. 2,976,840 (Hugus) discloses a complete structure having four casters and associated structure supporting a sling which both encloses and supports the animal. The animal's rear legs are allowed to hang through holes in a sling.

In U.S. Pat. No. 4,777,910 (Pecor), there is a two-wheel passive therapeutic exercise device providing non-weight bearing motion of the rear limbs. The rear feet are placed in boots attached to a crank-arm mechanism. A striding passive motion of the rear limbs is provided by mechanically geared energy derived from the back wheels. Passive movement of the disabled rear limbs is provided by the dog walking on the front limbs.

All of the foregoing patents are intended to assist mobility by the animal pulling itself along by its front legs while the rear quarters are supported in a two-wheeled device. U.S. Pat. No. 4,375,203 teaches an apparatus for the totally paralyzed rear limb animal. Flaccid full extension of the rear limbs results from this disability. Support height required for raising the extended rear limbs creates a stressful forward angulation on the shoulders of the animal. Flexion of the rear limbs is provided by tibial sling support allowing level walking position of the body. Secondly, balanced weight distribution between front and rear quarters by adjustable horizontal positioning of the axle through a plurality of holes in 2 axle blocks. Providing flexion of the rear limbs by means of slings allows leveling of the body to a normal walking position. An adjustment of axle wheel position horizontally achieves proper weight distribution between front and rear quarters reduces stress to a minimum while the animal is walking.

The art of animal cart design has centered on the use of rear limb, two-wheeled supportive carts. U.S. Pat. No. 2,970,840 (Hughes) discloses a complete structure having four casters and associated hammock support, which both encloses and supports the animal. The animal's rear legs are allowed to hang through the holes in the hammock structure. Lacking such embodiment as adequate wheel size for ease of function, directional control, or means of adjustment restricts the functional value of the Hughes invention.

SUMMARY OF THE INVENTION

The objective of this invention is to extend independent wheel support for both rear and front quarters in contrast to prior art units. Self-sustained mobility requires that at least partial weight bearing must be present in either the front or rear quarters. Front and rear wheel supporting elements can provide either front or rear quarters as a source of mobility. Extending the source of mobility expands the categories of disabilities assisted, such as forelimb amputees, forelimb birth defects, or total rear paralysis accompanied by forelimb weakness.

A mobile prosthetic apparatus for disabled four-legged animals generally includes a cart having a chassis wherein the chassis frame has oppositely located walls. Primary wheels are mounted to the frame at the rearward end of the frame while secondary wheels are mounted to the forward end. Each of the secondary wheels is swively mounted. In one practice of the invention a yoke is mounted to the forward end of the frame at the top of the chassis. The yoke has a first position which is connected to and spans the frame sidewalls. The yoke is movable to a second position so as to leave the space between the frame walls unobstructed by the yoke and thereby facilitate an animal being placed in or removed from the apparatus.

The chassis may be in the form of two subassemblies wherein a front subassembly includes both the forward portion of the frame and the secondary set of wheels, as well as a yoke when included in the apparatus. The second subassembly is a rearward subassembly having the rearward portion of the frame and the primary wheels. Both subassemblies are detachably connected together so that, for example, the rearward subassembly may be used independently as an apparatus for disabled animals not requiring the full benefits of the apparatus when both subassemblies are connected together.

Preferably the chassis frame is made of various tubular members which are adjustably connected together to provide for height, length and width adjustment so as to conform to the specific size of a particular animal. Tubular members are also lightweight. Various support straps or slings and leg supports may also be provided.

IN THE DRAWINGS

FIG. 1 is a side elevational view of a mobile prosthetic apparatus for disabled four-legged animals in accordance with one practice of this invention;

FIG. 2 is a top plan view of the apparatus shown in FIG. 1;

FIG. 3 is a top plan exploded view of two subassemblies used for forming the apparatus of FIGS. 1–2;

FIG. 4 is a front elevational view of the front subassembly shown in FIG. 3;

FIG. 5 is a view similar to FIG. 4 in a different phase of operation;

FIG. 6 is a rear elevational view of the apparatus shown in FIGS. 1–3 with portions of the front subassembly omitted for the sake of clarity;

FIG. 7 is a left side elevational view of the rearward subassembly shown in FIG. 3;

FIG. 8 is a fragmental elevational view showing the swivel wheels in the front subassembly of FIGS. 1–3;

FIG. 9 is a side elevational view showing a portion of the apparatus of FIGS. 1–3;

FIG. 10 is a fragmental cross-sectional view in elevation of the portion of the apparatus shown in FIG. 9;

FIG. 11 is a fragmental view in cross-section showing an adjustability feature of the apparatus of FIGS. 1–3;

FIG. 12 is a side elevational view of a further apparatus in accordance with this invention;

FIG. 13 is a front elevational view of the apparatus shown in FIG. 12; and

FIG. 14 is a cross-sectional elevation view of a portion of the apparatus shown in FIGS. 12–13.

DETAILED DESCRIPTION

An apparatus 10 of one embodiment of this invention is illustrated in FIGS. 1–3. Apparatus 10 would be used with a dog or other four-legged animal totally disabled in the rear quarters due to trauma, degenerative conditions, or any cause blocking motor nerve transmission to the rear limbs. The same apparatus can also be used for forequarter support. Causes for forelimb functional loss are include amputation, inherited defects, or any of the same conditions affecting the hindquarters. As later described the present invention supports the rear quarters by means of inserting the legs into padded rings. Total rear limb disability requires that the tibia be supported by padded slings to maintain normal walking position as well as preventing lower limb or foot injury. Secondary wheels provide partial weight bearing assistance to the forequarters to reduce weight stress and provide directional control for front limb ambulation. It should be noted that older large breed dogs are commonly disabled by a primary spinal cord degenerative disorder that progresses from total rear limb paralysis to partial motor loss in the forequarters. Padded elasticized cords provide partial support for the abdomen and chest. The elasticity of the padded cords maintains continuous dynamic support for the cyclical up and down motion of the animal while walking or running. This dynamic support applies to primary wheel support of either the front or rear quarters.

A subassembly of the apparatus with a set of primary wheels supports the forequarters by using the reversed support system providing padded chest rings for forequarter loss of function. The forequarters gain support from the primary wheels and from padded rings and mobility is derived from the rear quarters. Directional control and support is provided by secondary wheels extending lateral to the rear quarters. Forelimb lower limb sling support is provided by an attachment to the side bar. Dynamic padded body slings can be adjusted from the side bars attachments in the same manner as the rear quarters. Tibial flexion support is provided by padded elastic cord slings suspended from the primary wheel torsion bar.

In one practice of the invention a carriage chassis comprises a single tubular length angulated at two locations ventrally to form part of a triangular or U-shaped enclosure. This area provides attachment for a T-shaped primary wheel support containing a plurality of holes providing an attachment of variable wheel sizes and height adjustment. Side bars complete the top of the primary wheel enclosure and continue extended support for the shoulder or hip yoke and partial support for the secondary wheel apparatus. The chassis also comprises a posterior angular standard in the shape of a loop providing a torsion connection between the side frame members. Torsion elements, preferably four in number, are all interrupted midway to provide tailored width adjustments for the individual animal. Tubular over-riding sleeves provide the junction support, once fitting distance is established. Security of the sleeves are provided by a pin or riveting. Once the width setting is established, they are secured.

Additional torsion support is provided by a padded shoulder yoke. In one embodiment the yoke is permanently hinged on one side of the side bar or frame by a single horizontal bent member of the yoke. The opposite end is attached by a bracket to the opposing side bar of the frame and is locked when the apparatus is in use.

The yoke provides strength for the extended side bars, secondary wheels, body slings, and containment for the animal's body. Hinging of the yoke provides space for entry and exit of the animal. The secondary wheels are vertically supported on top by side bar extension through T connectors. Telescopic extension or shortening of the side bar provides adjustment for the secondary wheels. The secondary wheel lower support is derived from a U-shaped tubular member clamped to the lower torsion bar of the frame. A T adapter provides an attachment for the secondary wheel mount. A central pin supports the paired secondary wheels allowing 360° rotational or swivel movement of the paired wheels. The wheels are hinged by two segments forming a 45° angle. One arm is a horizontal element joined at the central arm. The second segment has a compression spring mounted at a 45° angle to the central post. The trailing attached paired wheels are capable of absorbing the shock of obstacles encountered while moving in any direction.

The secondary wheel is part of a subassembly or unit that can be considered a detachable unit providing optional support when needed. A vigorous animal capable of ambulation without stress on two primary wheels only should be offered support of the two primary wheels without the encumbrance of the secondary wheel unit.

A second option of the primary wheels provided is a clutch bearing in each wheel. This embodiment is especially helpful when only primary wheels are in use. The prevention of posterior movement allows an animal with minimal weakness to rest, when needed, against the braking force of the primary wheels. Pivoting on one wheel for direction change can be accomplished by an agile animal.

Universal adjustment of the apparatus is provided by telescoping capabilities of preferably tubular adjoining elements. Length, height, and width adjustment is provided by a central overriding tubular elements. Selection of compatible diameters and wall thickness provides endless snug-fitting extension and shortening capability. The order of adjustment for a specific animal begins with the height of the leg rings. This setting is established by the length forward of the main frame standards. Width is established by the length of the torsional connections. Connection of cart elements is provided by plastic T-connectors and telescoping tubes secured by pins, bolts, or rivets. Outward angulation of the primary and secondary wheels of ±15° is provided for increased stability of the cart in use and provides unobstructed movement for the limbs. Length of the torsional members determines the outward angulation.

Total rear quarter paralysis requires tibial flexion support to prevent lower limb injury when the animal is in normal horizontal walking position. If the rear quarters retain partial weight bearing ability leg rings are set at a height to allow use of the rear limbs in addition to the forelimbs. The invention provides for the totally rear limb paralyzed animal accompanied by weakened forequarters a means of support not offered by prior units.

The leg rings are independently suspended from the sidebars by suspension clamps. Foam padding is provided for abrasion injury protection. Independent suspension facilitates adjustment for male and female genitalia and forelimb disabilities. Adjustment and stability is provided by an interconnecting partially plastic coated cable with threaded tubes positioned between the leg ring and frame standard.

Flexible foam padded slings provide support for totally non-weight bearing rear quarters and forelimbs. The pendulous free-motion support of the limbs prevents abrasion injury. Suspension of the leg slings is provided by the lower posterior torsion tube of the rear limbs. Support for the forelimbs is derived from the horizontal sidebars.

The apparatus preferably uses lightweight support for both front and rearquarters with directional control for four-legged animals. The construction materials provide ease of adjustment for proper fitting in all parameters thereby reducing stress for self-assisted ambulation. Versatility of weight bearing provides mobility for either fore or rear quarters or both if necessary for ambulation. Finally, a wider range and degree of motor disabilities can be assisted than previously offered.

As shown in FIGS. 1–3 the mobile prosthetic apparatus 10 is in the form of a cart having a chassis with a forward end and a rear end. The chassis includes a frame having a pair of oppositely located side walls which are preferably generally of tubular form. It is to be understood, however, that while tubular members are preferred due to their lightweight and adjustability features the invention could be broadly practiced where the side walls completely or partially include solid sections such as of plate-like construction or where the members are flat bars slideably positioned against each other.

As shown in FIG. 3 the apparatus 10 is formed in two separate subassemblies, namely, a front subassembly 12 and a rearward subassembly 14. The two subassemblies are detachably mounted together as shown in FIGS. 1–2. Apparatus 10 includes both subassemblies to provide support for animals totally disabled in the rear quarters. Where only four quarter support is required the rear subassembly 14 may be used without having the front subassembly 12 attached thereto.

As illustrated, the sides of the frame of apparatus 10 are outwardly inclined from top to bottom. A set of primary wheels 16,16 is secured to the sides at the rearward end of apparatus 10 while a set of secondary wheels 18,18 is secured to the front end.

The frame includes as part of the front subassembly 12 a U-shaped tube 20 horizontally disposed and having a central portion 22 with outer legs 24. Each secondary wheel 18 is mounted to a post 26 extending vertically downwardly from the free ends of legs 24,24. The mounting may be done in any suitable fashion such as by a T-connector 28 which has a hollow horizontal passageway for receiving the leg portion 24 and a vertical passageway for receiving the post 26. The T-connector 28 also permits the exact positioning of each wheel 18 to be adjusted along the length of leg 24 of tube 20.

The central portion 22 of tube 20 is used not only to provide a brace extending across the frame, but also permits the detachable mounting of subassemblies 12 and 14. If desired, central portion 22 could be of a unitary construction so that tube 20 is of fixed dimension. Alternatively, tube 20 could be of two tubular portions wherein the ends telescope into each other at the central portion along the joint 30 to permit width adjustment of the front subassembly 12.

Front subassembly 12 also includes as part of each side of the frame an upward brace 32 which is connected to tubular member 20 by a T-connector 34 on each of the frame sides as best shown in FIG. 1. The T-connector 34 may be positioned at any suitable location on each leg 24 of tubular member.

As illustrated a second pair of horizontal tubular members 38,38 is located at and comprises the top of the frame for the front subassembly 12. One top tube 38 is telescopically connected to tubular extension 48. Alternatively each top tube 38 could have an extension 48 or the extension could be omitted from both top tubes 38. Each top tubular member has a T-connector 40,42 mounted at any suitable location on the tubular member 38 or 48. Each T-connector 40,42 has a vertical portion which receives a respective upward brace 32. The T-connectors 40,42 would be vertically aligned with respective T-connectors 34,34.

A shoulder yoke 36 spans the top of the frame. Yoke 36 is generally formed of a U-shaped generally rigid tubular member having one outwardly extending end 44 which is slidably received in the horizontal passage of T-connector 40. The other end of yoke 36 fits in the upwardly extending passageway of T-connector 46 which fits on tube 48 telescopically connected to its upper tubular member 38. FIG. 2, for example, illustrates the junction 50 of tubular members 38 and 48. Tubular member 48 is slidably received in the horizontal passageway of T-connector 42.

Yoke 36 has a padded outer sleeve 52 for added comfort to the animal at the shoulder. In the use condition illustrated in FIGS. 1–2 and 4 shoulder yoke 36 spans the side walls of the frame. Yoke 36 extends upwardly to provide maximum room to accommodate the animal. In order to facilitate the animal being placed in and removed from apparatus 10, yoke 36 is movable from the first position of use illustrated in FIGS. 1–2 and 4 to a second position illustrated in FIG. 5 which is totally away from tube 48 so as to leave a completely open space between the frame side walls unobstructed by the yoke until the animal has been positioned in apparatus 10 whereupon yoke 36 is then moved back to its first position. FIG. 5 illustrates in solid lines yoke 36 in the freely hanging position. Preferably, however, in its inactive position yoke 36 is in the position shown in phantom in FIG. 5 to leave the front of the apparatus completely open. Yoke 36 could be maintained in that phantom position by using the type of stop mechanism shown in and later described with respect to FIGS. 12–14.

Any suitable means may be used to facilitate moving the yoke to and from its position of use. FIG. 5, for example, shows yoke 36 to terminate in an end 45 extending from sleeve 52. The extension has an aperture or hole 54 extending completely through that free end 45 of the yoke. The apertured end 45 of yoke 36 would be selectively positioned in the upwardly extending passage of T-connector 46. See also FIG. 4. A slight bending of yoke 36 may be necessary. A hole 56 extends completely through the upwardly disposed passage of T-connector 46 for selective alignment with the hole 54 in the end 45 of yoke 36. When the holes are aligned a pin 58 is inserted through the aligned holes to lock the free end 45 of yoke 36 into T-connector 46. Pin 58 is preferably permanently secured to the front subassembly 12 such as by being mounted on a ring 60 which in turn is secured to T-connector 46 by a cord or cable 62.

In order to permit the movement of yoke 36 to and from its use position and its entrance/exit position, the end 44 of yoke 36 is free to pivot in T-connector 40. Such pivotal or rotational movement is in a vertical arc from the use position shown, for example, in FIG. 4 to the entrance/exit position shown in FIG. 5.

The arrangement of the preferred form of yoke 36 is particularly advantageous in that it selectively permits the yoke to remain engaged at one of its ends to the frame by the end 44 being slidably and pivotally mounted in T-connector 40 thereby permitting the yoke 36 to be selectively moved from the use position of FIG. 4 to the access position of FIG. 5. The slidable mounting of end 44 into T-connector 40 also provides the option of completely removing the yoke by simply withdrawing end 44 from T-connector 40. Complete removal of the yoke might be desired in order to replace the yoke with a larger or smaller yoke to accommodate different size animals. Complete removal might also be desired to permit the padding 52 to be cleaned or replaced.

If it is desired to expand the width of front subassembly 12, the central portion 22 of tubular member 20 would be expandable as previously described. Yoke 36 could also be expandable which might be accomplished by having the central portion of the yoke made of two telescopic tubular members. Alternatively a yoke 36 may be completely removed and replaced by a different size yoke.

The front subassembly 12 also includes a chest strap 64 mounted at any suitable location and preferably to yoke 36. Chest strap or sling 64 would be located forwardly of the front legs near the neck of the animal. Sling 64 could be an elastic cord 66 having a padded sleeve 68 around the cord. One end of the cord 66 could have a loop 70 permanently secured around an end of yoke 36 such as adjacent to the end of outer padding or sleeve 52. The other end of cord 66 could have a hook 72 which would loop around the hinge end 44 of yoke 36.

Chest strap 64 could be easily mounted to yoke 36 by inserting the loop 70 over the exposed end 45 of yoke 36 past the hole 54 when the yoke is in the access position shown in FIG. 6. When the yoke is in the assembled condition shown in FIG. 5 or when it is in the access position of FIG. 6 the hook 72 could be mounted to the pivot end 44 of yoke 36.

The front subassembly 12 preferably also includes a further chest sling 74 comprises an elastic cord 84 in a rigid bendable sleeve 77 with a padded outer sleeve 76. Chest sling 74 would be located rearwardly of the front legs and may be considered as a girth shoulder support sling. Chest sling 74 could be secured to the frame of the chassis of apparatus 10 in any suitable manner. For example, as illustrated in FIG. 2 one end of chest sling 74 terminates in a loop 78 which is slidably mounted around top tube 38. The chest sling 74 is preferably made from an elastic cord 84 wherein the outer padded sleeve 76 adds to the comfort to the animal. The opposite end of chest sling 74 is mounted to a T-connector 80 as shown in FIGS. 1–2 and 9–10. As shown in FIGS. 9–10, the free end of cord 84 is threaded through the lower tubular passage of T-connector 80 and exits through a hole 82. An adjustable fastener 86 is mounted on the exposed free end of cord 84 to lock the cord 84 in place and prevent it from being removed through hole 82. The adjustable mounting of fastener 86 permits the tension and the effective length of chest sling 74 to be adjusted. The location would then be secured by fastener 88.

It should be appreciated that each of the various T-shaped connectors has the advantage of permitting slidable mounting and thereby adjustability in the location of each connector. Each T-shaped connector may be provided with one or more locking members 88 to then lock the T-connector in place once the desired location is achieved. Fastener 88 could be a rivet or a screw or any other suitable fastener. Alternatively, at least some of the T-connectors, such as T-connector 80, may be free to slide.

Each set of secondary wheels 18,18 is freely mounted so as to be able to swivel 360°. FIG. 8 illustrates the mounting of one wheel 18. As shown, for example, in FIGS. 2–5 there would be a set of two wheels 18 along each side of the chassis frame. The two wheels are mounted on a common axle 90 which slides through a horizontal leg 92 of an angled bracket 94. A further horizontal leg 96 is perpendicular to leg 92 and is secured to vertical leg or post 26 by a pivot connection or pin 98. A pair of guide pins 100 connect the horizontal leg 96 with the vertical post 26. A spring 102 is mounted around the guide pins 100. This arrangement permits the movements illustrated by the arrows in FIG. 8. Although the drawings, such as FIG. 1, illustrate the post 26 to be connected to horizontal tube 20 by a T-connector, the post could simply extend through or otherwise be connected to horizontal tube 20 without the use of an adjustable T-connector.

The provision of the spring 102 around the spaced guide pins 100 acts as a shock absorber and permits vertical movement of each set of secondary wheels when hitting a bump. If desired, the bracket 94 could be formed wherein a compression spring is mounted between two washers or flanges on post 26 where the post is located at the horizontal member 24 to permit vertical movement by compressing or expanding the spring which thereby also acts as a shock absorber.

A further feature of having the various support slings, such as forward chest sling 64 and girth chest sling 74 and other later described support slings, removable is to permit the replacement with different size support slings and also to permit the removal of the padded sleeve around each support sling for cleaning or replacement purposes.

As illustrated the side walls of the frame extend outwardly from top tubes 38 toward horizontal tube legs 24. This angled frame provides greater stability and facilitates accommodating the animal in the chassis. The secondary wheels 18,18 are preferably mounted in a vertical orientation which would be perpendicular to the ground whereas the primary wheels 16 are mounted at an angle which is preferably the same as the angle of the inclined sides of the frame.

As with the front subassembly 12, the rearward subassembly 14 also has its side walls outwardly inclined. The frame includes a pair of top tubes 104, each of which is inserted into a T-connector 106 which also receives top tube 38 of front subassembly 12. In one alternative top tubes 38 and 104 may be separate tubes received by and locked in T-connector 106. In this alternative, when the subassemblies 12,14 are detached, the tubes 38,104 would be separated from each other at the T-connector 106 with the T-connector remaining on either tube or being removed from both tubes. In a further alternative top tubes 38 and 104 may be a single unitary tube extending through T-connector 106. This alternative is shown in FIG. 3 where the single tube designated as 38 terminates in a reduced diameter stub 49 which telescopes into and is permanently or detachably locked to tubular extension 48. When the subassemblies 12,14 are detached, temporarily locked tubes 104 and 38,48 could be separated. Otherwise, the side braces 32,32 could be removed from T-connector 40,42 to permit detachment of the subassemblies.

As shown in FIG. 1, a side brace 108 on each side of the frame is mounted into the vertical passageway of T-connector 106. The lower end of each side brace 108 is in an inclined vertical passageway of a T-connector 110. Each side brace 108 is part of a U-shaped tube which extends through T-connector 110 to form one leg of the tube with the bight of the tube 112 being located near the primary wheels 16. The tube then extends upwardly to form another leg 114 which fits in a T-connector 116 with the horizontal passageway of T-connector 116 receiving top tube 104. If desired, the U-shaped tube could be made from separate tube sections corresponding to segments 108, 112 and 114 wherein the tube sections are secured together in any suitable manner such as by a telescopic mounting or by further sleeves or T-connectors. As shown in FIG. 3 and in FIG. 6, the pair of side braces 108 is interconnected by a horizontal cross brace assembly which includes a pair of end tubes 118 telescopically mounted in a central tube 120. Central tube 120 is detachably connected by fasteners 122 to the central section 22 of horizontal tube 20 to join the front subassembly 12 and rearward subassembly 14 together in a detachable manner. Any suitable form of fastener may be used such as bolts and nuts 122.

An abdomen support sling 124 is mounted across top tubes 104. Abdomen support sling 124 is similar to chest girth sling 74 and comprises an elastic cord 130 which is inserted through a rigid bendable sleeve in an outer padded sleeve 126. As shown in FIG. 2 one end of the cord is formed into a loop 128 which extends around a top tube 104. As shown in FIG. 1, the other free end or cord 130 is threaded through the vertical passageway of T-connector 132 and exits through a hole in the vertical passageway. The free end of cord 130 is then engaged by any suitable locking device 134 to lock the free end in place. This permits the length and tension of the abdomen support strap 124 to be adjusted similar to the manner of adjusting the chest girth sling 74. The use of T-connectors and loops to mount the support slings 74 and 124 permits the slings to be slidably positioned on the frame. In addition, it is possible to completely remove the straps when it is desired to replace the slings with slings of a different dimension or to remove the padded sleeves for cleaning purposes.

The height and thus the location of the various slings such as abdomen support sling 124 in the rearward subassembly 14 could be adjusted by providing a series of holes extending completely through side braces 108. The holes would be selectively aligned with holes in the vertical passages of the T-connector 110 so that the location of the T-connector on the length of the side braces could be selected and then maintained in place. This would in turn control the location of the cross-brace assembly formed by tubes 118 and 120, as well as the height of the front subassemblies because the horizontal central portion 22 of the front subassembly 12 is mounted to the vertically adjustable central tube 120.

Each primary wheel 16 is mounted to a side of the frame by a T-shaped bracket 136 which is partially shown in FIGS. 1–2. Each bracket 136 is in the form of a pair of mirror image generally T-shaped halves 138 which are joined together at the junction line 140. The tops or horizontal portions of the halves 138 of bracket 136 have semicircular recesses which jointly form a circular passageway through which side brace 108 would be inserted. The lower or vertical portions of each half 138 form a horizontally located circular passageway fitting around the U-shaped portion 112 of the side brace. Similarly, a vertical passageway is formed by the two bracket parts 138,138 which fit around the brace portion 114. The vertical portion of bracket 136 preferably includes a series of vertically aligned holes one of which would be selectively used for receiving the axle 142 of each primary wheel 16. This provides for height adjustability.

The individual halves 138 of the primary wheel mounting bracket 136 may be secured together in any suitable manner such as by bolts extending through aligned holes in the halves with a nut mounted to each bolt. The halves may have a series of horizontally arranged aligned holes for the selective mounting of any number of bolts or other fasteners.

Preferably each primary wheel 16 has a solid cross section, such as being made of a solid material (e.g. rubber) or being foam filled, rather than being air-filled. As illustrated in FIG. 6, each primary wheel 16 is angled preferably at the same angle of inclination as the side walls of the frame. The primary wheel mounting assembly may include a thrust bearing to permit only one way rotation of each primary wheel.

As illustrated, the side walls of the frame of the rearward subassembly 14 include a U-shaped central member 144 which telescopically receives the free ends of side tubes 114. The extent to which the free ends telescope into the central member 144 could be controlled by a fastener 146 (FIG. 1) which would be inserted through one of a series of aligned holes only one of which is shown. Any suitable type of fastener may be used such as rivets.

Central portion 144 would function as a shoulder yoke when the rearward subassembly 14 is in the reversed position and comprises the sole apparatus for the animal. Central portion or yoke 144 could be adjustable in length to permit width adjustment of the rearward subassembly. As shown in FIG. 7 the central portion 144 could be padded which would be particularly desirable when it functions as a yoke. Central portion 144 is also a cross brace. When both subassemblies are mounted together central portion 144 is a handle.

Support and stability for the frame is achieved not only through the use of the central member 144, but also from a cross brace assembly which spans the tubes 114,114 at a height slightly above the primary wheels 16,16. This support arrangement, shown in FIGS. 2–3, and 6, includes a pair of end tubes 148,148 each of which has one end inserted into the horizontal passageway of a T-connector 150. The side tubes 114 extend through the vertical passageway of the T-connector 150. The opposite ends of each end tube 148 is telescopically received in a central tube 152. The extent to which the end tubes 148,148 are received in tube 152 would control the width of the rearward subassembly 14 which would also be controlled by the effective length of the extent that end tubes 118,118 are received in tube 120.

FIG. 11 illustrates a mode of mounting the end tubes 148,148 into tube 152. A similar arrangement could be used for tubes 118,120. As shown in FIG. 11 each end tube 148 has a snap button 154 which could be biased in any suitable manner such as by a spring 156 to an outward position. Outer tube 152 would have a series of holes 158. When a selected hole 158 is positioned over a spring biased pin 154 the pin would be urged through the hole to firmly hold the end tube 148 in that longitudinal location. In order to change the location or to remove the tubes from each other the pin 154 would be depressed sufficiently so that it is no longer in its hole 158.

As shown in FIGS. 1, 6 and 7 a tibia sling 160 is mounted over each end tube 148 in any suitable manner. Each tibia sling is preferably in the form of an elastic cord 162 inserted through a padded sleeve 164. As shown in FIG. 6, one end of the cord 162 is formed into a loop 166 which extends around outer tube 148. The other end of the cord is secured to a hook 168 which is hooked over outer tube 148.

The rearward subassembly 14 also includes a pair of hip slings 170 inclined toward each other. See FIGS. 1–2. Each hip sling 170 is in the form of a rigid metal or plastic tubular closed loop member 172 with the lower or support portion being inserted through a padded sleeve 174. The upper portion of loop 172 extends through a passageway of a connector 176. Each top tube 104 extends through a further horizontal passageway in connector 176. If desired, the pair of slings 170,170 may be secured to each other and to the side walls of the frame in any suitable manner. As illustrated in FIG. 2 a padded cord 178 interconnects the loops 170,170 with each other while rigid tubes 180 around a cable connect each loop to a side tube 114.

The angle of the inclined slings 170 may be adjusted to thereby control the spacing between the slings. The adjustment is achieved by adjusting the angle that the tube 172 extends through its connector 176. Connector 176 may be formed as a two-piece mirror image bracket with the pieces secured together by fasteners 177 such as nuts and bolts. Thus, the fasteners may be temporarily loosened and the tube 172 rotated until the desired angle is achieved and then the angle is set by tightening the fasteners. An advantage in being able to adjust the spacing of the loops is to take into account whether the animal is a male or female. For a male animal the loops would be spaced a greater distance to accommodate the male genitalia whereas for a female the loops could be spaced closer together.

The central connecting member 178 has enough slack or could be made of an elastic material to permit the hip slings to move toward and away from each other. The outer connectors 180 serve as rigid spacers and would be dimensioned to permit inward and outward movement of each hip sling.

Where the entire apparatus is used the animal would have its legs inserted through the slings 160 and 170. The rigid slings 170 would support the hips while the lower portions of the legs would be through the tibial slings 160. The abdomen would be supported by sling 124 while the chest would be supported by slings 74 and 64.

A particular advantage of apparatus 10 is that the front subassembly 12 and the rear subassembly 14 may be detached from each other. This permits the use of the rear subassembly as a mobile prosthetic apparatus in itself depending upon the disability of the animal. Where the rear subassembly itself is used as the apparatus the orientation would be reversed from what is illustrated so that the animal would be facing in the reverse direction from where the animal would be when both subassemblies are jointly used.

Subassemblies 12 and 14 could be attached/detached in various manners. For example, where top tubes 38 and 104 are separate members disposed against each other in T-connector 106, tubes 38,38 would be removed from T-connectors 106,106 and cross brace 22 would be detached from cross brace 120 and T-connectors 106 could be part of the detached front subassembly 12. Alternatively, top tubes 38 and 104 could be portions of the same integral tubes. The detachment would be to detach cross brace 22 from cross brace 120 and to detach side tubes 32,32 from T-connectors 40,42. The subassembly 12 would then be horizontal tube 20, side tubes 32 and the structure related to secondary wheels 18,18. If desired yoke 36 and shoulder sling 74 could also be removed.

FIGS. 12–14 illustrate a further embodiment 10A of this invention which could be of a smaller size than the embodiment shown in FIGS. 1–11. In that regard, the overall length of the frame for apparatus 10 of FIGS. 1–11 might be generally about 3 feet long and the width could generally be about 2 feet wide and the height could be about 2 feet high. The apparatus 10A of FIGS. 12–14 might be dimensioned wherein its overall length is less than 2 feet with its overall width being about 1 foot and its overall height being slightly greater than 1 foot. The spacing between the top rails could be almost 1 foot with the apparatus 10, while the spacing between the top rails of apparatus 10A would be about 6 inches. It is to be understood that the above noted dimensions are merely representative particularly since one of the features of the invention is the ability to adjust the various dimensions.

Apparatus 10A is particularly designed to provide front quarter support. The structure illustrated in FIGS. 12–14 includes various alternative features which could be incorporated in apparatus 10. Otherwise, apparatus 10A would preferably include some or all of the advantageous features of apparatus 10, including detachability of the front and rearward subassemblies.

The variations shown in FIGS. 12–14 include an alternative yoke structure. As shown therein yoke 36A could be movable to and from its use position shown solid in FIG. 13 to its entrance/exit position shown in phantom. This could be accomplished by snapping one end 45A of yoke 36A into the vertical passageway of T-connector 42A. The opposite end of yoke 36A would be fixed in the vertical passage of the T-connector 40A. T-connector 40A is itself mounted for rotation about the frame top tube 38A. Thus, the yoke 36A could be moved to the position shown in phantom by disconnecting end 45A from T-connector 42A. Yoke 36A would then rotate by rotating the fixed end of yoke 36A attached to rotatable T-connector 40A. As illustrated in FIG. 14 a stop pin 192 is permanently mounted to the frame top tube 38A in a radial slot 194 formed in T-connector 40A. The stop pin 192 would limit the extent of rotation of yoke 36A by limiting the rotation of T-connector 40A.

It is to be understood that the invention for apparatus 10 or 10A may be practiced wherein some of the slings illustrated and described are removed and/or where additional slings are included for further body support. Apparatus 10A in FIGS. 12–14, for example, shows the inclusion of a shoulder yoke 36A and a chest girth sling 74A for the front subassembly 12A. The rearward subassembly 14A includes hip slings 170A as well as slings 182 and 184. Sling 182 would provide support for the rear of the animal and could be an elastic cord mounted through a padded sleeve. Sling 184 would be located above the animal and could be permanently mounted to the same T-connector 186 which receives the cord 188 of sling 182. The tension in sling 182 is adjusted by lock 190 secured to the free end of the elastic cord.

Sling 184 is connected at one end to T-connector 186 on one side of the apparatus while the other end of sling 184 may be hooked to its T-connector such as by being hooked to a U-shaped extension of the T-connector.

FIGS. 12–13 also illustrate each hip sling 170A of apparatus 10A to be entirely padded, instead of partially padded as in apparatus 10.

The mobile prosthetic apparatus of this invention has a number of distinct advantages. For example, the apparatus would be lightweight offering support to both front and rear quarters and independently reduce stress. There is independent support for the front and rear quarters with optional rotation of the part by 180° for disabled fore limbs where the rear limbs become the source of mobility. This would be done where only the rearward subassembly 14 is used.

There is unobstructed space for partial weight bearing or space for non-functioning limbs in slings by the removal of various cross-members.

The apparatus has increased stability resulting from the angled sides with outward wheels 16,18 which are located away from the limbs.

There is maximum accessibility for entry and exit of the animal from the apparatus particularly with the provision of the hinged shoulder yoke bar 36 or 36A.

Adjustability in the various dimensions is achieved through the use of such features as telescoping members, T-connectors and snap buttons. Where the primary wheels 16 use thrust bearings there is locking stance support. The apparatus also provides for directions control through the axial rotation of the secondary wheels 18.

Adjustability is also achievable because the apparatus can be split along its axis due to the adjustability provided by the cross-braces joining the side walls of the frame together. This permits the selection of different size frames with the same frame structure to accommodate different size animals. There is thus, in effect, total adjustability.

The apparatus provides dynamic sling support for such areas as the chest and abdomen where elastic cords which could be monofilament bungee cords are used. Such cords support the underside of the animal and are inserted through padded sleeves to add comfort. One end of each cord can have its tension adjusted. The various slings include slings at the rearward subassembly for the legs. In addition there is a sling for each leg on the side.

Maintenance is reduced through the use of such features as foam filled or solid tires as the primary wheels instead of air filled tires. The secondary wheels are capable of shock absorption by the use of compression strings.

The apparatus permits height adjustment by providing for selective vertical mounting of the primary wheels. There is also enhanced adjustment of the hip slings 170 located higher than the primary wheels. There is independent suspension of each hip sling. These are just some of the features which make the apparatus unique.

What is claimed is:

1. A mobile prosthetic apparatus for disabled four-legged animals comprising a cart, said cart having a chassis with a forward end and a rearward end and a top and a bottom, said chassis including a frame, said chassis comprising a front subassembly and a rearward subassembly, each of said subassemblies including a portion of said frame, said frame having side walls, said rearward subassembly including a primary wheel mounted at each of said side walls, a rearward cross brace unit interconnecting said side walls of said frame of said rearward subassembly, a hip sling mounted to each of said side walls of said frame in said rearward subassembly, at least one secondary wheel mounted at each of said frame sidewalls of said front subassembly, each of said secondary wheels being swively mounted, at least one support sling mounted across said frame sidewalls, and said front subassembly and said rearward subassembly being detachably mounted together.

2. The apparatus of claim 1 wherein said front subassembly includes a shoulder yoke mounted to and above the top of said side walls, said shoulder yoke being movably mounted to and from a first position mounted across said side walls and a second position away from at least one of said side walls to facilitate access and exit to said chassis.

3. The apparatus of claim 2 wherein said yoke is pivotally mounted to one of said side walls for pivotal movement in a vertical plane, said yoke including a padded sleeve, and said yoke being completely removable from said frame.

4. The apparatus of claim 1 wherein each of said hip slings is a rigid loop mounted to a respective one of said side walls, said hip slings being inclined toward and spaced from each other, and each of said hip slings being pivotally mounted to said side wall to permit adjustment of the spacing of said hip slings from each other.

5. The apparatus of claim 1 wherein each of said primary wheels is adjustably mounted to its side wall to different selected vertical positions.

6. The apparatus of claim 5 wherein said side walls are inclined, said secondary wheels being vertically mounted for being perpendicular to a support surface, said primary wheels being inclined at the same angle as said side walls, and said primary wheels having a solid cross-section.

7. The apparatus of claim 6 wherein each of said primary wheels is mounted for only one-way rotation.

8. The apparatus of claim 1 wherein said at least one secondary wheel comprises a set of two secondary wheels mounted on a common axle at each of said side walls, and each set of said secondary wheels being mounted to a bracket which is mounted to said frame and being mounted to permit vertical movement.

9. The apparatus of claim 1 wherein said at least one support sling includes a chest sling for supporting the girth of the animal and an abdomen support sling, and each of said chest sling and said abdomen support sling being adjustable in tension.

10. The apparatus of claim 9 wherein a pair of tibial slings is mounted to said rearward cross brace unit, a forward chest sling mounted across said side walls, each of said slings being padded, said shoulder girth sling and said abdomen support sling being slidably mounted to said frame, each of said tibial slings being slidably mounted at one end to said cross brace unit and being detachably mounted at its other end to said cross brace unit, and said forward shoulder sling being detachably mounted to one of said side walls.

11. The apparatus of claim 1 wherein said rearward subassembly is adjustable in width, and said cross brace unit being adjustable in length.

12. The apparatus of claim 1 wherein said cross-brace unit is a rearward cross brace unit mounted to the rearward end of said rearward subassembly, a forward cross brace unit being mounted across said side walls at the forward end of said rearward subassembly, said forward cross brace unit being adjustable in length, a cross brace extending across said walls of said front subassembly, said cross brace of said front subassembly being detachably mounted to said forward cross brace unit of said rearward subassembly, said frame including top members at said side walls of each of said front assembly and said rearward subassembly detachably mounted together, a second shoulder yoke mounted to said rearward subassembly, and said frame being adjustable width and in length and in height.

13. A mobile prosthetic apparatus for disabled four-legged animals comprising a cart, said cart having a chassis with a forward end and a rearward end and a top and a bottom, said chassis including a frame having a pair of oppositely located side walls, at least one cross brace unit extending across and interconnecting said side walls, a primary wheel mounted to said frame at each of said side walls at said rearward end, a secondary wheel mounted at each of said side walls at said forward end, each of said secondary wheels being swively mounted to said frame, a shoulder yoke mounted to said frame side at said forward end and said top of said chassis, said yoke having a first position connected to and spanning said frame walls, said yoke being movable from said first position to a second position leaving the space between said frame side walls unobstructed by said yoke, and at least one sling mounted to and spanning said frame side walls for supporting the animal.

14. The apparatus of claim 13 wherein said yoke is pivotally mounted at one end to one of said side walls and detachably mounted at its other end to the other of said side walls.

15. The apparatus of claim 14 wherein said yoke is pivotally mounted for movement in a vertical plane, said yoke being removably mounted at its pivot end, said yoke being in the form of a rigid member covered by a padded sleeve, a stop mechanism on said frame for limiting the extent of pivotal movement of said yoke, and including a locking assembly for locking said end of said yoke detachably mounted to said side wall.

16. The apparatus of claim 15 wherein said at least one sling includes a pair of hip slings, each of said hip slings being a rigid loop in a padded sleeve mounted to a respective one of said side walls, said hip slings being inclined toward and spaced from each other, and each of said hip slings being pivotally mounted to said side wall to permit adjustment of the spacing of said hip slings from each other.

17. The apparatus of claim 13 wherein said at least one sling comprises a chest girth support sling and an abdomen support sling, and each of said chest girth support sling and said abdomen support sling being adjustable in tension.

18. A mobile prosthetic apparatus for disabled four-legged animals comprising a cart, said cart having a chassis with a forward end and a rearward end and a top and a bottom, said chassis including a frame, said frame having side walls, a primary wheel mounted at each of said side walls, a rearward cross brace unit interconnecting with side walls of said frame at said rearward end, a front cross brace unit interconnecting said side walls at said rearward end, a hip sling mounted to each of said side walls of said frame, a shoulder yoke mounted to and above the top of said side walls, each of said primary wheels being adjustably mounted to its side wall at different selected vertical positions, and each of said primary wheels being mounted for only one-way rotation.

19. The apparatus of claim 18 wherein each of said hip slings is a rigid loop mounted to a respective one of said side walls, said hip slings being inclined toward and spaced from each other, and each of said hip slings being pivotally mounted to said side wall to permit adjustment of the spacing of said hip slings from each other.

20. The apparatus of claim 18 wherein said side walls are inclined, said primary wheels being inclined at the same angle as said side walls, and said primary wheels having a solid cross section.

* * * * *